May 30, 1939.                    J. M. COLBY                    2,159,983
              STEERING MECHANISM FOR SELF-PROPELLED VEHICLES
                           Filed May 6, 1938
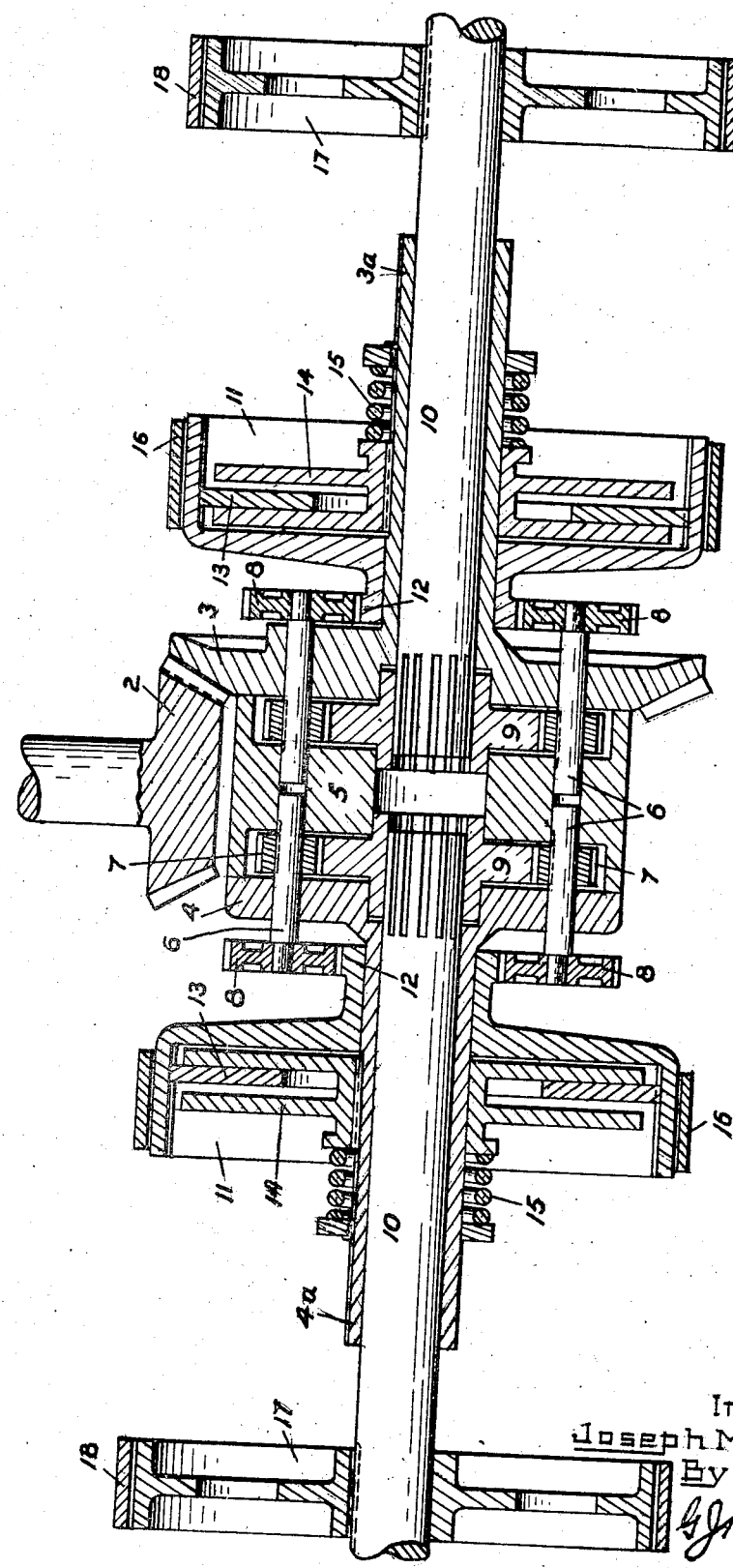
Inventor
Joseph M. Colby
By
G. J. Kessenich
Attorney Patented May 30, 1939

2,159,983

UNITED STATES PATENT OFFICE 2,159,983

STEERING MECHANISM FOR SELF-PROPELLED VEHICLES

Joseph M. Colby, Fort Benning, Ga.

Application May 6, 1938, Serial No. 206,368

4 Claims. (Cl. 180—17)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a steering mechanism for self-propelled vehicle and is designed primarily for self-propelled vehicles of the tracklaying type.

The main objects of the invention are the provision of a steering mechanism which will permit of relatively high speeds without placing undue strain on the parts of the vehicle and one which will at the same time permit of proper maneuvering of the vehicle in confined spaces.

One practical embodiment of the invention is disclosed by way of illustration in the accompanying drawing, wherein the figure is a sectional plan view of a device constructed in accordance with the invention.

Referring to the drawing by numerals of reference:

A fragment of the usual transmission shaft is shown at 1 provided with a pinion 2 which meshes with a disk including a ring gear 3 forming one side wall of an epicyclic cage the other side wall of which is an annular disk 4 spaced from the gear 3 by a ring 5. The gear 3 and disk 4 are provided with aligning annularly spaced apertures which also align with annularly spaced recesses formed in opposite faces of the ring 5 which apertures and recesses receive shafts 6 upon each of which is mounted to turn therewith an inner planetary gear 7 and an outer planetary gear 8.

The inner planetary gears 7 mesh with the respective sun gears 9—9 which are suitably housed in the cage and formed to receive the inner ends of the axles 10—10 to which they are fixed for angular movement therewith.

The gear 3 and disk 4 each is formed with a centrally disposed sleeve 3a and 4a respectively, extending from its outer face and receiving its respective axle 10 with a loose fit and upon each sleeve is loosely mounted a brake drum 11 formed with a sun gear 12 meshing with the planetary gears 8. Associated with each brake drum are elements 13 of a clutch the cooperating element 14 of which is keyed to its respective sleeve and normally forced into engagement with the element 13 by suitable means such as the springs 15—15. The elements 14 of the clutches are thrown out of engagement in the usual and well known manner.

Associated with each brake drum 11 is the usual brake band 16 while on each axle 10 is keyed a brake drum 17 to be engaged by its associated brake band 18.

The operation of the device is as follows:

In straight-away driving both the right and left clutches 13—14 are engaged and the system acts as an integral unit, the pinion 2 driving the gear 3 clockwise as viewed from the right in the drawing. By disengaging both clutches and applying both brake bands 16 to hold the sun gears 12 stationary and provide an epicyclic action, the speed of the axles 10—10 and their associated tracks is decreased. By virtue of this arrangement it is possible to obtain two speeds for each transmission ratio without disengaging the master clutch. This is an important asset when traveling over difficult terrain, where shifting the main transmission would cause such a loss of rolling momentum as to require the employment of a lower gear.

When it is desired to change direction by turning on a moving pivot, for example to the right, the right clutch is disengaged and the brake band applied to the right sun gear 12. As a result of the epicyclic action through planetary gears 7—8 the speed of the right axle 10 is decreased while the speed of the left axle is not altered.

When it is desired to turn to the right on a fixed pivot, the right brake band 18 is applied to lock the right axle 10 against movement while the left axle continues to rotate as before. In this arrangement the planetary gear 7 moves around the sun gear 9.

I claim:

1. In a steering by driving mechanism, a pair of aligned axles, a pair of spaced disks having oppositely extending sleeves each rotatably mounted on one axle, means for driving one of the disks, a sun gear splined on the inner end of each axle, a ring spacing the disks and also spacing the sun gears, aligned shafts journaled in the ring and in the spaced disks and connecting these members to form a cage, planetary gears fixed to each shaft one inside the cage meshing with the sun gear of an axle and one outside the cage, a brake drum rotatably mounted on each sleeve and including a sun gear meshing with the corresponding outside planetary gear, means for clutching each brake drum to its corresponding sleeve, a brake band for engaging each drum, a brake drum fixed on each axle, and a brake band for each fixed brake drum.

2. In a steering by driving mechanism, a pair of aligned axles, a pair of spaced disks each rotatably mounted on the axle, a sun gear splined on the inner end of each axle, a ring spacing the sun gears and disks and cooperating with the disks to form a cage, means for driving the cage, planetary gears carried by each disk one inside the cage meshing with the sun gear of an axle and one outside the cage, a brake drum adjacent each disk and rotatable relative thereto, each brake drum including a sun gear meshing with the corresponding outside planetary gear, means for clutching each brake drum to its corresponding disk, a brake band for engaging each drum, a brake drum fixed on each axle, and a brake band for each fixed brake drum.

3. In a steering by driving mechanism, a cage, means for driving the cage, a pair of axles having inner ends within the cage, a sun gear on each axle, sets of planetary gears carried in opposite sides of the cage and each set including a gear inside the cage meshing with the sun gear of an axle and a gear outside of the cage, a pair of brake drums on opposite sides of the cage and rotatable relative thereto, each brake drum including a sun gear meshing with the corresponding outside planetary gear, means for clutching each brake drum to the cage, a brake band for engaging each drum, a brake drum fixed to each axle, and a brake band for each fixed brake drum.

4. In a steering by driving mechanism, a cage, means for driving the cage, a pair of axles having inner ends within the cage, a sun gear on each axle, sets of planetary gears carried in opposite sides of the cage and each set including a gear inside the cage meshing with the sun gear of an axle and a gear outside of the cage, a pair of brake drums on opposite sides of the cage and rotatable relative thereto, each brake drum including a sun gear meshing with the corresponding outside planetary gear, means for clutching each brake drum to the cage, and a brake band for engaging each drum.

JOSEPH M. COLBY.